US008467290B2

(12) United States Patent
Gazier et al.

(10) Patent No.: US 8,467,290 B2
(45) Date of Patent: Jun. 18, 2013

(54) METHODS AND SYSTEMS FOR DISTRIBUTED AUTHENTICATION AND CACHING FOR INTERNET PROTOCOL MULTIMEDIA SUBSYSTEM AND OTHER SESSION INITIATION PROTOCOL SYSTEMS

(75) Inventors: Michael A. Gazier, Ottawa (CA); Lyndon Y. Ong, Sunnyvale, CA (US); Ian H. Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 748 days.

(21) Appl. No.: 11/645,458

(22) Filed: Dec. 26, 2006

(65) Prior Publication Data

US 2008/0155659 A1 Jun. 26, 2008

(51) Int. Cl.
*H04J 3/14* (2006.01)
*H04L 12/26* (2006.01)

(52) U.S. Cl.
USPC .......................................... 370/230; 370/252

(58) Field of Classification Search
USPC ........................................ 370/230, 260, 252
See application file for complete search history.

(56) References Cited

U.S. PATENT DOCUMENTS

| | | | | |
|---|---|---|---|---|
| 6,691,164 | B1 * | 2/2004 | Hundscheidt et al. | 709/225 |
| 6,741,997 | B1 * | 5/2004 | Liu et al. | 1/1 |
| 6,785,256 | B2 * | 8/2004 | O'Neill | 370/338 |
| 6,938,090 | B2 | 8/2005 | Isomaki | |
| 7,170,863 | B1 * | 1/2007 | Denman et al. | 370/260 |
| 2004/0121760 | A1 | 6/2004 | Westman et al. | |
| 2004/0162818 | A1 * | 8/2004 | Shaw | 707/3 |
| 2005/0174991 | A1 * | 8/2005 | Keagy | 370/352 |
| 2006/0130126 | A1 * | 6/2006 | Touve et al. | 726/5 |
| 2006/0251043 | A1 * | 11/2006 | Madour et al. | 370/349 |
| 2007/0067302 | A1 * | 3/2007 | Bailey et al. | 707/10 |
| 2007/0086338 | A1 * | 4/2007 | Robert et al. | 370/230 |
| 2007/0101408 | A1 * | 5/2007 | Nakhjiri | 726/4 |
| 2007/0189215 | A1 * | 8/2007 | Wu et al. | 370/331 |
| 2008/0028436 | A1 * | 1/2008 | Hannel et al. | 726/1 |
| 2008/0065718 | A1 * | 3/2008 | Todd et al. | 709/203 |

OTHER PUBLICATIONS

Cisco Call Session Control Platform; Copyright 1992-2006 Cisco Systems, Inc. All rights reserved. This document is Cisco Public Information; Cisco.com Website at www.cisco.com/go/offices; 11 pages.

* cited by examiner

*Primary Examiner* — Mark Rinehart
*Assistant Examiner* — Angel Brockman
(74) *Attorney, Agent, or Firm* — Clements Bernard PLLC; Christopher L. Bernard; Lawrence A. Baratta, Jr.

(57) ABSTRACT

Network elements in IMS or other SIP systems are configured to pre-authenticate SIP requests either as proxy or by snooping. One or more of these network elements are pre-loaded with a local database copy of the user profiles as typically contained in the HSS inside of the IMS control structures. A master database, such as the one typically contained in the HSS, is distributed to all network elements using database distribution methods. Advantageously, pre-authentication solves bottleneck issues in the SIP mechanism by allowing an end user device to use fully authenticated SIP requests. This prevents the requirement to perform authentication, authorization, and accounting (AAA) all the way back to the core IMS network, alleviating lag and scaling issues. Additionally, network elements including can become aware of the services requested through SIP requests, and track these requests for optimization. Specifically, resources requested based upon SIP requests can be cached.

17 Claims, 2 Drawing Sheets

METHODS AND SYSTEMS FOR DISTRIBUTED AUTHENTICATION AND CACHING FOR INTERNET PROTOCOL MULTIMEDIA SUBSYSTEM AND OTHER SESSION INITIATION PROTOCOL SYSTEMS

CROSS-REFERENCE TO RELATED APPLICATION(S)

This application incorporates by this reference in their entirety for all purposes commonly assigned U.S. patent applications filed Aug. 31, 2006:

| Application No. | Title |
| --- | --- |
| 11/513,606 | "METHODS AND SYSTEMS FOR SESSION INITIATION PROTOCOL CONTROL OF NETWORK EQUIPMENT" |

Furthermore, this application incorporates by reference for all purposes, commonly assigned U.S. patent applications filed Sep. 29, 2006:

| Application No. | Title |
| --- | --- |
| 11/540,786 | "METHODS AND SYSTEMS FOR EXTENSIBLE MARKUP LANGUAGE CONTROL OF NETWORK EQUIPMENT" |

FIELD OF THE INVENTION

The present invention relates generally to methods to authentication/identification and caching on Internet Multimedia Subsystem (IMS) and other Session Initiation Protocol (SIP)-based systems. More specifically, the present invention relates to pre-authenticating/identifying SIP requests with network elements other than the Home Subscriber System (HSS) or the like to reduce bottlenecks, and to interpreting SIP requests to cache resources.

BACKGROUND OF THE INVENTION

SIP is a network resource abstraction that obtains services. According to IETF RFC 3261, "SIP an application-layer control (signaling) protocol for creating, modifying, and terminating sessions with one or more participants. These sessions include Internet telephone calls, multimedia distribution, and multimedia conferences." SIP is a protocol developed by the IETF MMUSIC Working Group. SIP has been accepted as a 3rd Generation Partnership Project (3GPP) signaling protocol, as well as a permanent element of the IP Multimedia Subsystem (IMS) architecture. It is one of the leading signaling protocols for Voice-over-Internet Protocol (VoIP), along with H.323.

In IMS, SIP servers or proxies, collectively called Call Session Control Function (CSCF), typically provide centralized route engine, policy management, and policy enforcement point facilitating the delivery of multiple real-time applications using IP transport. This function is application-aware and uses dynamic session information to manage network resources (feature servers, media gateways, and edge device), and provides advance allocation of these resources per application and user context.

The Proxy-Call Session Control Function (P-CSCF) is a subscriber's first contact point within IMS; it may be from a visited network when roaming. It accepts requests and serves them internally or forwards them, e.g. to an Interrogating CSCF (I-CSCF) in the user's home network. The Serving-CSCF (S-CSCF) identifies the user's service privileges with the Home Subscriber Server (HSS), then selects and provides access to desired network facilities or resources. It is usually located in subscriber's home network. The Home Subscriber Server (HSS) is the master user database that supports IMS network entities that are handling calls/sessions. It contains subscription-related information, such as user profiles, performs authentication and authorization of a user, and provides physical information about the location of the user. The Interrogating-CSCF (I-CSCF) may be used by the P-CSCF to gain access to the right S-CSCF in the user's home network. In one example, the flow is P-CSCF to I-CSCF to S-CFCF to another network to I-CSCF to the HSS. In another example, the other (home) network's HSS may pass some amount of info to the current network's HSS thus avoiding the need to dial back to the home network for the info while roaming.

IMS is a standardized Next Generation Networking (NGN) architecture for telecommunications operators to provide fixed and mobile multimedia services. It uses a VoIP implementation based on a 3GPP-standardized implementation of SIP, and runs over the standardized IP. Existing packet-switched and circuit-switched telephone systems are supported. IMS provides all existing and new services that the Internet provides. IMS uses open standard IP protocols, as defined by the Internet Engineering Task Force (IETF). Thus, multimedia sessions between two IMS users, between an IMS user and a user on the Internet, or between two users on the Internet are established using exactly the same protocol. The interfaces for service developers are also based on IP protocols. IMS uses fixed wireline access (e.g., Digital Subscriber Loop (DSL), cable modems, Ethernet, etc.), mobile wireless access (e.g., Wideband Code Division Multiple Access (W-CDMA), Code Division Multiple Access 2000 (CDMA2000), Global System for Mobile Communications (GSM), General Packet Radio Service (GPRS), etc.), and fixed wireless access (e.g., wireless local area network (WLAN), Worldwide Interoperability for Microwave Access (WiMAX), etc.) to provide physical connectivity and Internet routing and applications technologies in order to provide services. Services with SIP are being integrated through the IMS architecture into a next-generation network (NGN) network.

Currently, user identification and authentication functionalities, including authorization and accounting, are done in a centralized location in IMS and other SIP-based systems. The main SIP network elements used for authentication and identification are the User Equipment (UE), P-CSCF, S-CSCF, and the HSS. The 3GPP Technical Specification 33.203 v7.3.0 (2006-09), which is herein incorporated by reference in its entirety, describes the current standard view of the interaction between these elements in identifying, authenticating, and registering users. Advantageously, centralized user identification and authentication alleviates the need for different applications to manage these functions. Further, new applications can be added without the need for separate identification and authentication interfaces.

Cisco Systems of San Jose, Calif. provides a CSCP Subscriber Database which uses a distributed data management model (details available at http://www.cisco.com/application/pdf/en/us/guest/products/ps6562/c1650/cdccont_0900a ecd80396990.pdf). However, the CSCP Subscriber Database is an alternative to the HSS. Further, the CSCP Subscriber Database distributes subscriber information to a Data Authority Server (DAS) which manages all profile and network data within an individual site or point-of-presence (POP), and not to network elements directly. Here, the network elements responsible for call session control, e.g., Cisco CSCP-SE (Service Engine), CSCP-EP (Edge Proxy), and CSCP-NRS (Name Resolution Server), interface to the DAS for authentication and identification. Disadvantageously, these methods introduce additional elements into the network, and replace the HSS in the IMS framework.

IMS and other SIP based systems are an architecture that relies on devices registering and on SIP to request services between user terminals. As described above, SIP can be used to request any service, such as Internet telephone calls, multimedia distribution, and multimedia conferences. For example, the requests can be for a video channel or video-on-demand (VoD). Currently, no mechanisms exist to cache resources requested by SIP like what is done at the HyperText Markup Language (HTML) layer. This is similar to the limitations in system architecture from the earliest stages of the World Wide Web (WWW) development with the Hyper Text Transfer Protocol (HTTP) and HTML.

Disadvantageously, IMS and other SIP based systems face performance issues as they scale due to the centralized authentication/identification, authorization and account, and with the consequent inherent lack of caching mechanisms for these key resources.

BRIEF SUMMARY OF THE INVENTION

Network elements in IMS or other SIP systems are configured to pre-authenticate SIP requests either by proxy or by snooping. These network elements are pre-loaded with a local database copy of the user profiles as typically contained in the HSS inside of the IMS control structures. A master database, such as the one typically contained in the HSS, is distributed to one or more network elements using database distribution methods. Advantageously, pre-authentication solves bottleneck issues in the SIP mechanism by allowing an end user device to utilize fully authenticated SIP requests by interacting with the one or more network elements, making any request the same be it for bandwidth, channel change, video-on-demand movie, or any service including voice-over-IP, connectivity, fixed mobile convergence (FMC) handoff, etc. This prevents the requirement to perform authentication or service provisioning requests, including authorization and accounting, all the way back to the core IMS network, alleviating lag and scaling issues in the IMS network.

Additionally, network elements including edge or switch nodes can become aware of the services requested through SIP requests and track these requests for optimization. Specifically, resources requested based upon SIP requests can be cached or even pre-cached based on predictions by the network elements. In other words, the network elements observe users' behaviors and service requests to optimize service requests by interpreting the SIP requests that are integrated into the IMS infrastructure.

In an exemplary embodiment of the present invention, a method for distributing authentication in Internet Protocol Multimedia Subsystem and other Session Initiation Protocol systems includes loading a local database copy of user profiles in edge elements in a network, and pre-authenticating Session Initiation Protocol requests by service requestors utilizing the local database copy of the user profiles, wherein the pre-authenticating includes partial or full authentication of the Session Initiation Protocol requests. The method further includes authorizing and accounting the Session Initiation Protocol requests utilizing the local database copy of the user profile. Also, the method further includes loading the local database copy of the user profiles in switch elements in the network, and updating the local database copy of the user profiles. The user profiles include substantially the same information as contained in the Home Subscriber System. The Session Initiation Protocol requests are pre-authenticated by proxy or by snooping. Optionally, the method further includes pre-authenticating Extensible Mark-Up Language requests utilizing the local database copy of user profiles, wherein the pre-authenticating comprises partial or full authentication of the Extensible Mark-Up Language requests.

In another exemplary embodiment of the present invention, a method for resource caching in Internet Protocol Multimedia Subsystem and other Session Initiation Protocol systems includes observing a user's requests for services, and loading a caching mechanism responsive to the user's request for services, wherein the request for services includes a Session Initiation Protocol request or an Extensible Mark-up Language request. The method further includes observing the user's vector through space and location, and loading the caching mechanism responsive to the user's vector through space and location. The caching mechanism is aware of the user, a service type, and a community of users, and wherein the caching mechanism performs caching responsive to the user, the service type, and the community of users.

In yet another exemplary embodiment of the present invention, an enterprise private network or service provider network utilizing Internet Protocol Multimedia Subsystem or Session Initiation Protocol includes a plurality of edge elements; a plurality of switch elements, wherein the plurality of edge elements and plurality of switch elements are interconnected; and a local database comprising user profiles, wherein the local database is pre-loaded on one or more of the plurality of edge elements. The one or more of the plurality of edge elements are configured to pre-authenticate Session Initiation Protocol requests utilizing the local database. Optionally, the local database is pre-loaded on the plurality of switch elements, and one or more of the plurality of switch elements are configured to pre-authenticate Session Initiation Protocol requests utilizing the local database. The user profiles include substantially the same information as contained in the Home Subscriber System. The local database is updated periodically with current user profile data through distributed database techniques. The Session Initiation Protocol requests are pre-authenticated by proxy or by snooping. Additionally, the edge elements are configured to cache resources responsive to Session Initiation Protocol requests.

BRIEF DESCRIPTION OF THE DRAWINGS

The present invention is illustrated and described herein with reference to the drawings, in which like reference numbers denote like system components and/or method steps, as appropriate, and in which.

DETAILED DESCRIPTION OF THE INVENTION

Network elements in IMS or other SIP systems are configured to pre-authenticate SIP requests either by proxy or by snooping. The network elements configured for pre-authentication can include a subset or all of the network elements in the system. These network elements are pre-loaded with a local database copy of the user profiles as typically contained in the HSS inside of the IMS control structures. A master database, such as the one typically contained in the HSS, is distributed to network elements using database distribution methods. Advantageously, pre-authentication solves bottleneck issues in the SIP mechanism by allowing an end user device to use fully authenticated SIP requests, making any request the same be it for bandwidth, channel change, video-on-demand movie, or any service including voice-over-IP, connectivity, FMC handoff, etc. This prevents the requirement to perform authentication for all requests, all the way back to the core IMS network, alleviating lag and scaling issues in the IMS network.

Additionally, network elements including edge and switch nodes can become aware of the services requested through SIP requests and track these requests for optimization. Specifically, resources requested based upon SIP requests can be cached. In other words, the network elements observe users' behaviors and service requests to optimize service requests by interpreting the SIP requests that are integrated into the IMS infrastructure. For example, this could provide distribution of VoD content in a network optimal fashion. The authentication functionalities of the present invention include Authentication, Authorization and Accounting (AAA) functions as are known in the art for network access and usage.

Figure 1:
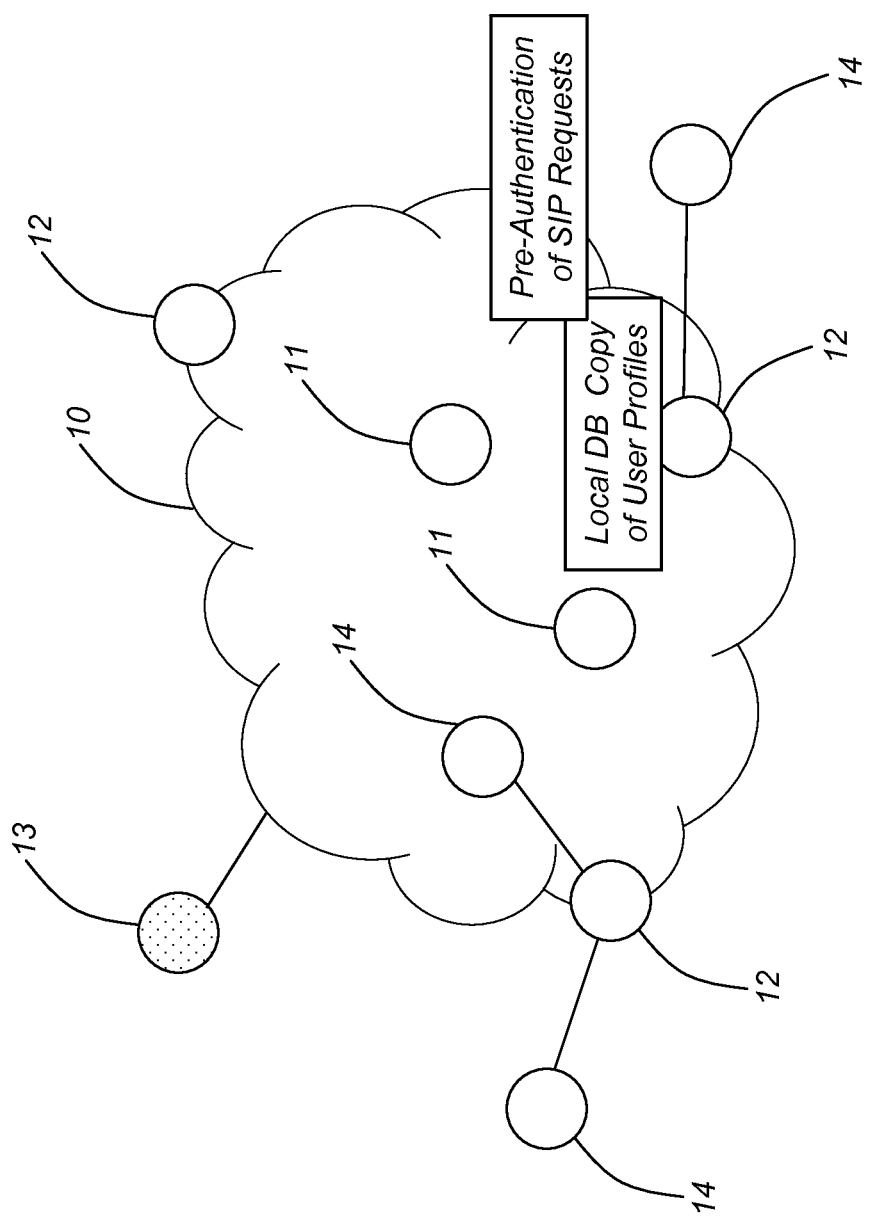
FIG. 1 is an illustration of an enterprise private network or service provider network configured to utilize SIP to generate requests for network resources.
Figure 2:
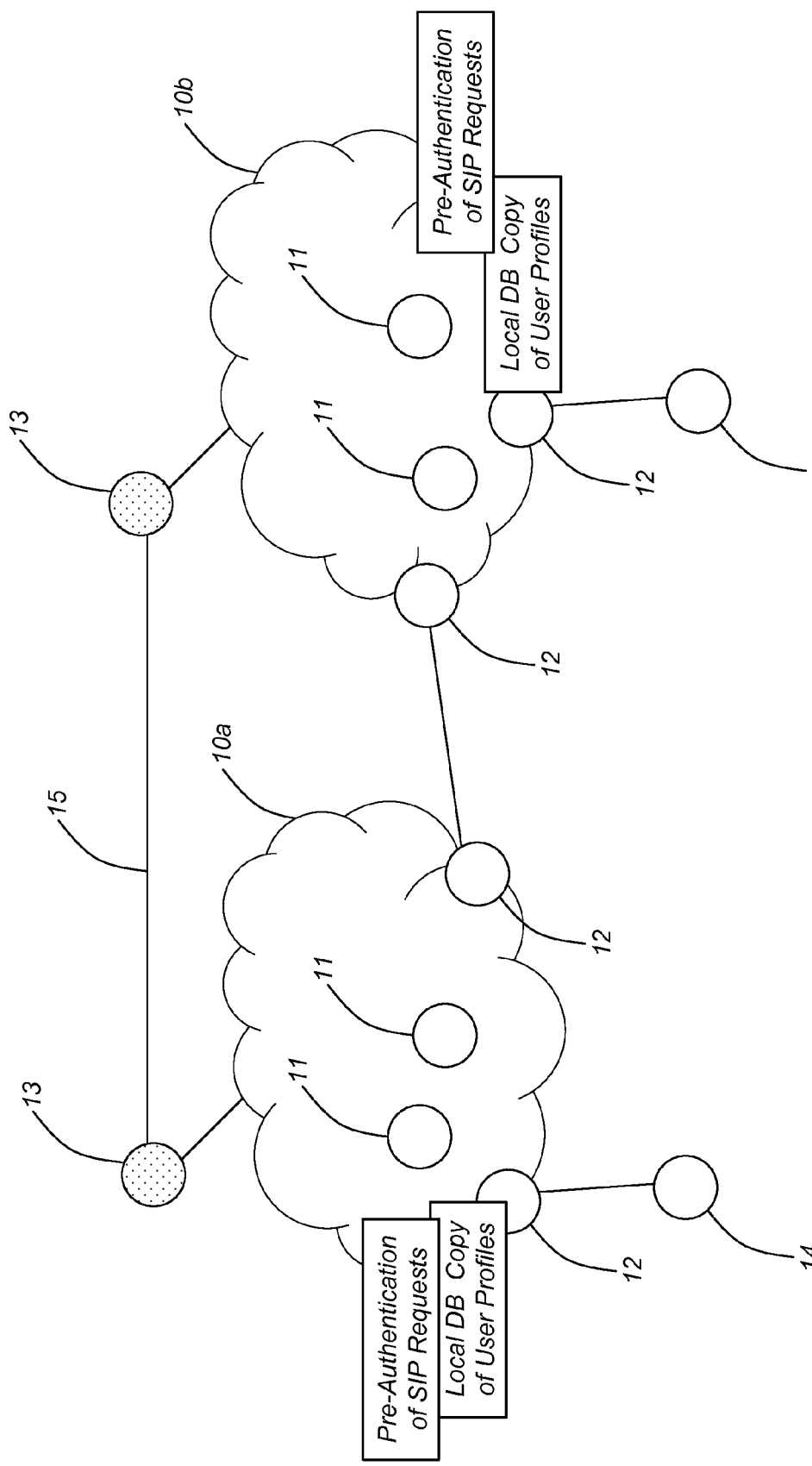
FIG. 2 is an illustration of two enterprise private networks or service provider networks configured to utilize SIP to generate requests for network resources.

Referring to FIGS. 1 and 2, enterprise private networks or service provider networks 10,10a,10b are configured to utilize SIP to generate requests for network resources. The networks 10,10a,10b include switch elements 11, edge elements 12, and service requestors 14. The switch and edge elements 11,12 and service requesters 14 can be network elements such as a core/edge router, broadband remote access switch (BRAS), switch (Ethernet or asynchronous transfer mode (ATM)), or the like. In a typical network 10, the core switch elements 11 include Internet Protocol (IP) routers either over wavelength division multiplexed (WDM) systems, IP routers over SONET/SDH, or the like. The edge elements 12 typically include edge routers, BRAS, Ethernet switches, or the like.

The service requestors 14 can include any type of network element including switch elements 11 and edge elements 12, and can be within or outside of the network 10. For example, the service requestor 14 can be an element 11,12 within the network, or it can be an element 14 accessing the network through any network access means such as fixed wireline access (e.g., DSL, cable modems, Ethernet, etc.), mobile wireless access (W-CDMA, CDMA2000, GSM, GPRS, etc.), fixed wireless access (WLAN, WiMAX, etc.), and the like.

The networks 10,10a,10b include control entities 13 operable to utilize SIP to obtain services on the network 10. For example, the control entities 13 can include IMS control entities such as the CSCF, HSS, and the like, as are known in the art. Further, the control entities 13 can include a single network element or multiple network elements, and the entities 13 can be either co-located or at separate locations. The control entities 13 are configured to perform some or all of centralized routing, policy management, policy enforcement, authentication and authorization of a user with subscription-related information (e.g. user profiles), and locating of users. As described herein, the control entities 13 can include IMS entities such as the P-CSCF, I-CSCF, S-CSCF, and HSS. Additionally, the control entities 13 could be something with a similar function subset as the IMS control entities but different name, such as Dynamic Host Configuration Protocol (DHCP) in an Internet Protocol (IP) system. In FIG. 2, different networks 10a, 10b each have their own control entities 13 which can be connected through a network connection 15. Advantageously, the separate control entities 13 can be configured to share information.

In an exemplary embodiment, the present invention enables user authentication, authorization, and accounting at one or more of the edge elements 11, and possibly at one or more of the switch elements 12 to pre-authenticate, authorize, and account SIP requests from the service requestors 14 by proxy or by snooping. This can include full authentication or partial authentication of SIP requests, full or partial authorization, and accounting of the SIP requests. If the SIP channel is encrypted, the elements 11,12 can have the keys to decrypt (and re-encrypt if snooping) the data. In IMS, typically, the SIP channel is encrypted up to the GPRS Gateway Support Node (GGSM) or to the CSCF. As discussed here, the decryption and encryption keys can be dynamic or pre-shared, and the encryption can include IP Security (IPSec), possibly both on the control and data path, or any other type as is known in the art.

In the proxy embodiment, the SIP request is terminated in some fashion, whereas in the snooping embodiment the request is simply observed. For example, a proxy contains the decrypting keys, and terminates the SIP request, for example, for a new broadcast channel selection in a Digital Subscriber Line Access Multiplexer (DSLAM). This SIP request is authenticated and authorized, but as the broadcast channel is already available at the DSLAM, the SIP request is simply served once authenticated and authorized. The user is found to be allowed access to the requested channel and is provided such. A proxy may have various methods to inform the network, IMS, or billing systems of "local" operations including statistic gathering and reporting, full operation record gathering and reporting, or letting selected requests pass through to the network, following specific rules.

In a snooping scenario, the same proxy operation may occur (either on the same stream or on a copy of the original stream), and the request will continue to the network(s) 10,10a,10b, control entities 13, etc. This may include decrypting and re-encrypting the request in order to decode the request and to ensure the channel remains secure up to the network. Re-encryption can be done in a variety of methods, such as recreating the original datagram, recreating a new modified datagram that spoofs the original, or using the proxy element's credentials and a new datagram possibly with new information added.

Edge elements 12 and switch elements 11 can be pre-loaded with a local database copy of the user profiles as typically contained in the HSS inside of the IMS control structures (i.e., control entities 13), or suitably modified. Further, the local database copy can be updated using distributed database techniques to ensure the user profiles are current. It is noted that due to locality constraints such as that provided in Fiber to the Premises (FTTP), DSL, or Cable plant, the majority of users are known, and only a small subset of the HSS or equivalent structure needs to be pre-loaded into elements 11,12. Therefore, the local database copy can either be a full copy of all user profiles known in the control entities 13, or a partial copy based on users known to access the elements 11,12. The local database copy can be updated periodically or responsive to events in the network(s) 10,10a,10b. An example of pre-loaded HSS info would be which users are allowed access to what services and authentication keys. For example, a certain user is allowed to watch the basic television service plus all sports or movie channels.

Additionally, events can cause loading of selected additional profiles into the local database copy, for example a user signals for a resource causes the entire user's profile to be distributed to relevant network elements 11,12, or alternatively causes a further piece of the user's profile to be distributed, or alternatively of the user's community. Another method to select proper users or profiles can be based on physical location, for example, customers connected to a DSLAM are good candidates for pre-loading of their profiles along the connectivity path to that DSLAM. The same may be done with pre-caching of content as described herein, for example, a user is known to watch certain channels, movies, games, etc., can cause pre-loading of appropriate content material or even of advertising media as examples.

Advantageously, this solves bottleneck issues in the SIP mechanism by not requiring authentication, authorization, and accounting back to the control entities 13, or at least not requiring real-time authentication (i.e., it may be done in soft real-time or off-line as needed without impacting service delivery). A typical example is channel change for a television. Instead of having to have a special message such as Internet Group Management Protocol (IGMP) to perform channel switching, the service requester 14 (i.e. end user device) uses fully authenticable SIP requests, making any request the same be it for bandwidth, channel change, a VoD movie, or any other service including VoIP, connectivity, FMC handoff, or gaming.

The user profiles are distributed to the elements 11,12 using modern distributed database technique as are known in the art. In an exemplary embodiment, the database utilizes a multi-stage cascaded distributed architecture. For example, a database available from Oracle of Redwood Shores, Calif., such as the Oracle Database 10g, could be used to manage user profiles at the various elements 11,12 and in the control entities 13. Such a database would be able to replicate and update changes to the various local copies of the user profiles distributed to the elements 11,12.

In one embodiment of the present invention, edge elements 12 will perform pre-authentication, authorization, and accounting of SIP requests from service requesters 14 in and outside of the network 10. It is anticipated that most service requests from requestors 14 will come through edge elements 12. In another embodiment, both elements 11,12 will both be configured to perform the pre-authentication, authorization, and accounting.

In an another exemplary embodiment, the present invention utilizes switch and edge elements 11,12 to become aware and track services requested through SIP. This allows caching mechanisms to be introduced in the network(s) 10,10a,10b to cache resources responsive to SIP requests. Here, the elements 11,12 are configured to monitor SIP requests from service requestors 14 and operate a cache mechanism responsive to the SIP request. Advantageously, caching resources responsive to SIP requests can reduce bandwidth usage, server load, and perceived "lag".

For example, one of the elements 11,12 could notice a SIP request to ask for a video channel or movie on demand. User privileges may or may not be taken into account when proceeding to loading the cache. A cache load mechanism could start streaming the video channel or movie on demand into the local area. In other words, the elements 11,12 observe user behaviors and service requests to optimize service requests by interpreting the SIP requests that are integrated into the IMS infrastructure.

Currently, the end services interpret requests typically at the Hypertext Transfer Protocol (HTTP) level. However, this means deep packet inspection, and tends to serve each request, and not consider the service level of each user as an individual. The present invention focuses on service level requests at the SIP level, individualized to each user's profile (based on the pre-loaded database in each element 11,12). For example, a user is known to have specific chains of requests, such as different television channels they usually access, or different sequences of events (e.g., surf television, then surf VoD catalog, then transfer to cell phone video service). As the SIP mechanism identifies the user as part of the authentication, and identify the specific service as part of the SIP request, appropriate services can be triggered including services, media, advertisement, etc. It focuses on requests that are integrated into IMS by using SIP, and allowing a caching mechanism to be triggered by these.

Examples include setting up a switch resource profile in view of the movie a user wants to see, setting up latency requirements for a gaming application, and can go all the way up to bring the gaming server software or movie into a local cache (be it fully loaded or simply building the path to the next available service point).

The caching mechanism itself can be in many forms as are known in the art. It can be implemented in elements 11,12 or in elements that receive triggers generated through this caching logic described in this patent. The caching mechanism could, for example, be a VoD server that is signaled a particular user profile has been triggered. The VoD system can receive assistance at many granularity levels, ranging from user profiling (e.g., User #1111) to class profiling (e.g., "sports fan") to service profiling (e.g., "television has been turned on", or "VoD server has been accessed"). The caching media can range from small buffers, e.g. 2 seconds of all movies in order to avoid start up delays, to massive, e.g. Disk arrays with the top 1000 movies. The caching mechanisms can be self-contained with their own protocols, often proprietary and application specific, e.g. a specific vendor's VoD distribution system, to proprietary but not application specific, e.g. a database vendor's distribution system, to non proprietary. It can be managed by the applications, e.g. a local VoD system interfacing with other VoD systems possibly including a central repository, or, for example, by the IMS system, e.g. an IMS application instructs various servers to distribute given material.

The caching mechanism of the present invention is aware of a user, a service type, a community of users, and the like in order to know what services to cache, including, for example, media, services, network configuration, or advertisements. The networks 10,10a,10b can be preconfigured for the next services expected. Also, content can be moved locally ahead of time, either in network elements 11,12 or in co-located elements that could even be IMS application servers or other dedicated application servers such as VoD servers.

For example, a user can be watching video or listening to audio on a device, such as a cell phone, and the network could wish to load content along likely paths, such as nearby cell towers. This would allow the content to be readily available as the user moves location. Here, the caching mechanism is predictive with respect to the user's vector through space and location in addition to predictive with respect to content. Additionally, this could allow other services such as advertising based on location.

As described herein, the present invention utilizes elements 11,12 in the networks 10,10a,10b to perform pre-authentication and pre-interpretation for caching. As such, the networks 10,10a,10b are able to pre-setup services and network resources (including content and software) so that by the time the entire IMS and caching infrastructures are operable, the services will be ready.

Further, the present invention can be adapted to extensible mark-up language (XML) requests. In general, XML is a W3C-recommended general purpose markup language that is used to create special purpose markup languages, capable of describing a plurality of different kinds of data. XML describes data and contains the data as well, in a database. It is a subset of Standard Generalized Markup Language (SGML), and its primary purpose is to facilitate the sharing of data across different systems, including those connected to the Internet. Languages that are based on XML include Geography Markup Language (GML), Resource Definition Framework (RDF)/XML, Rich Site Summary (RSS), Atom, MathML, Extensible HyperText Markup Language (HTML), Scalable Vector Graphics (SVG), MusicXML, etc. These languages can be modified and validated by programs without prior knowledge of their form. Pre-authentication and caching can be done based on XML service requests instead of SIP based requests.

XML is generally used in different networks such as an enterprise network instead of a telecom IMS network. XML can contain SIP inside of the XML. All authentication networks will contain a root entity such as the control entities 13, the differences being in how various entities are tied together and where authentication is done. In another exemplary embodiment, the pre-authentication and caching mechanisms described herein can be implemented on a network which utilizes XML to generate service requests such as described in Applicant's U.S. patent application Ser. No. 11/540,786 filed Sep. 29, 2006, and entitled "METHODS AND SYSTEMS FOR EXTENSIBLE MARKUP LANGUAGE CONTROL OF NETWORK EQUIPMENT", which is herein incorporated by reference.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A method for distributing authentication in Internet Protocol Multimedia Subsystem and other Session Initiation Protocol systems, the method comprising the steps of:

loading a local database copy of user profiles in an edge element in a network from a remotely located master user database, wherein the edge element provides network access, and wherein the local database copy of the user profiles comprises one of a full copy of all user profiles known in a control entity and a partial copy of only user profiles known to access the edge element;

pre-authenticating Session Initiation Protocol requests by service requestors utilizing the local database copy of the user profiles at the edge element without involvement of the remotely located master user database, wherein the pre-authenticating comprises partial or full authentication of the Session Initiation Protocol requests, and wherein the pre-authenticating is performed by the edge element concurrently while the edge element provides the network access to the service requestors; and providing services to the service requestors responsive to the Session Initiation Protocol requests;

wherein the edge element is configured to cache network resources comprising content and software responsive to the Session Initiation Protocol requests in a predictive manner.

2. The method of claim 1, further comprising the steps of:

authorizing the Session Initiation Protocol requests utilizing the local database copy of the user profile; and accounting the Session Initiation Protocol requests utilizing the local database copy of the user profile.

3. The method of claim 2, wherein the edge and switch elements have decryption keys to view the Session Initiation Protocol requests.

4. The method of claim 3, wherein the keys comprise dynamic and pre-shared keys, and wherein the encryption is Internet Protocol Security (IPSec).

5. The method of claim 1, further comprising the step of loading the local database copy of the user profiles in switch elements in the network.

6. The method of claim 1, further comprising the step of updating the local database copy of the user profiles.

7. The method of claim 1, wherein the local database utilizes a multi-stage cascaded distributed architecture.

8. The method of claim 1, wherein the user profiles comprise substantially the same information as contained in the Home Subscriber System.

9. The method of claim 1, wherein the local database copy comprises a partial copy of the user profiles corresponding to users of the network.

10. The method of claim 1, further comprising the steps of pre-authenticating Extensible Mark-Up Language requests utilizing the local database copy of user profiles, wherein the pre-authenticating comprises partial or full authentication of the Extensible Mark-Up Language requests.

11. A method for resource caching in Internet Protocol Multimedia Subsystem and other Session Initiation Protocol systems, the method comprising the steps of:

observing a user's request for services at an edge node or switch node of a network, wherein a user generating the user's request is known to access the edge node or switch node in advance, and wherein the user is pre-authenticated at the edge node or switch node without involvement of a Home Subscriber System, wherein the pre-authentication is perform at the edge node or the switch node while concurrently providing network access to the user;

loading a caching mechanism and caching services comprising network resources comprising content and software responsive to the user's request for services in a predictive manner, wherein the user's request for services comprises a Session Initiation Protocol request or an Extensible Mark-up Language request; and providing the services to the user responsive to the user's request for services.

12. The method of claim 11, further comprising the steps of:

observing the user's vector through space and location; and loading the caching mechanism responsive to the user's vector through space and location.

13. The method of claim 11, wherein the caching mechanism is aware of the user, a service type, and a community of users, and wherein the caching mechanism performs caching responsive to the user, the service type, and the community of users.

14. An enterprise private network or service provider network utilizing Internet Protocol Multimedia Subsystem or Session Initiation Protocol comprising:
- a plurality of edge elements;
- a plurality of switch elements, wherein the plurality of edge elements and plurality of switch elements are interconnected; and
- a local database comprising user profiles, wherein the local database is pre-loaded on one or more of the plurality of edge elements from a remotely located master user database, and wherein the local database is a copy of a Home Subscriber Service database, and wherein the local database comprises one of a full copy of all user profiles known in a control entity and a partial copy of only user profiles known to access the one or more of the plurality of edge elements;
- wherein the one or more of the plurality of edge elements are configured to pre-authenticate, authorize, and account for Session Initiation Protocol requests utilizing the local database without involvement of the remotely located master user database, and wherein the pre-authenticating is performed by the one or more of the plurality edge elements concurrently while providing network access to service requestors associated with the requests; and
- wherein the edge element is configured to cache network resources comprising content and software responsive to the Session Initiation Protocol requests in a predictive manner.

15. The enterprise private network or service provider network of claim 14, wherein the local database is pre-loaded on the plurality of switch elements, and one or more of the plurality of switch elements are configured to pre-authenticate, authorize, and account Session Initiation Protocol requests utilizing the local database without involvement of the remotely located master user database.

16. The enterprise private network or service provider network of claim 14, wherein the user profiles comprise substantially the same information as contained in the Home Subscriber System.

17. The enterprise private network or service provider network of claim 14, wherein the local database is updated periodically with current user profile data through distributed database techniques.

* * * * *